United States Patent [19]

Massa

[11] Patent Number: 4,868,799

[45] Date of Patent: * Sep. 19, 1989

[54] MEANS FOR EQUALIZING THE INTERNAL PRESSURE IN AN UNDERWATER TRANSDUCER EMPLOYING A VIBRATILE PISTON TO PERMIT OPERATION OF THE TRANSDUCER AT WATER DEPTHS IN EXCESS OF A FEW HUNDRED FEET

[75] Inventor: Donald P. Massa, 280 Lincoln St., Hingham, Mass. 02043-1796

[73] Assignees: Frank Massa; Donald P. Massa; Gitta M. Kurlat, all of Cohasset, Mass.; Trustees of The Stoneleigh Trust

[*] Notice: The portion of the term of this patent subsequent to Aug. 9, 2005 has been disclaimed.

[21] Appl. No.: 255,391

[22] Filed: Oct. 11, 1988

[51] Int. Cl.$^4$ ............................................. H04R 13/00
[52] U.S. Cl. ..................................... 367/172; 367/175
[58] Field of Search ............... 181/120, 167, 172, 178, 181/179, 402; 367/143, 148, 163, 166, 167, 171, 172, 174, 175, 7

[56] References Cited

U.S. PATENT DOCUMENTS

| 3,501,741 | 3/1970 | Wallen et al. | 367/172 |
| 3,803,544 | 4/1974 | Wallen et al. | 367/172 |
| 4,763,307 | 8/1988 | Massa | 367/174 |

Primary Examiner—Brian S. Steinberger

[57] ABSTRACT

A deep-water low-frequency transducer employs a collapsible air chamber to equalize the internal transducer air pressure with the external hydrostatic pressure at the submerged operating depth. A capsule containing a highly pressurized gas is mounted inside the collapsible air chamber and an automatic valve mechanism releases the gas to inflate the collapsed air chamber at a predetermined depth, beyond which any further reduction in the air volume would impair the operation of the transducer. With the collapsed air chamber restored to its original full volume, the transducer will operate satisfactorily at increased water depths.

20 Claims, 1 Drawing Sheet

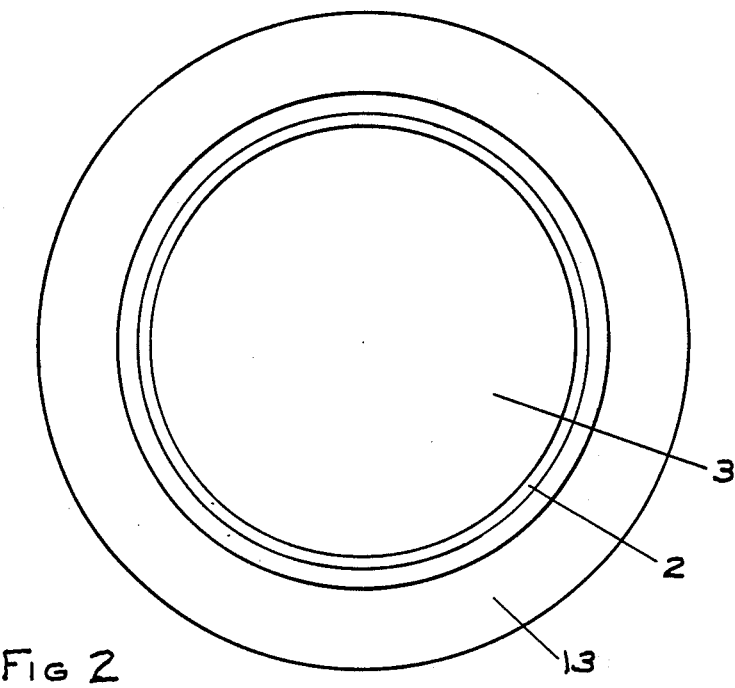
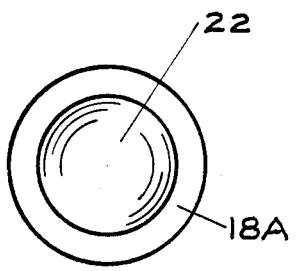
Fig 2
Fig 3
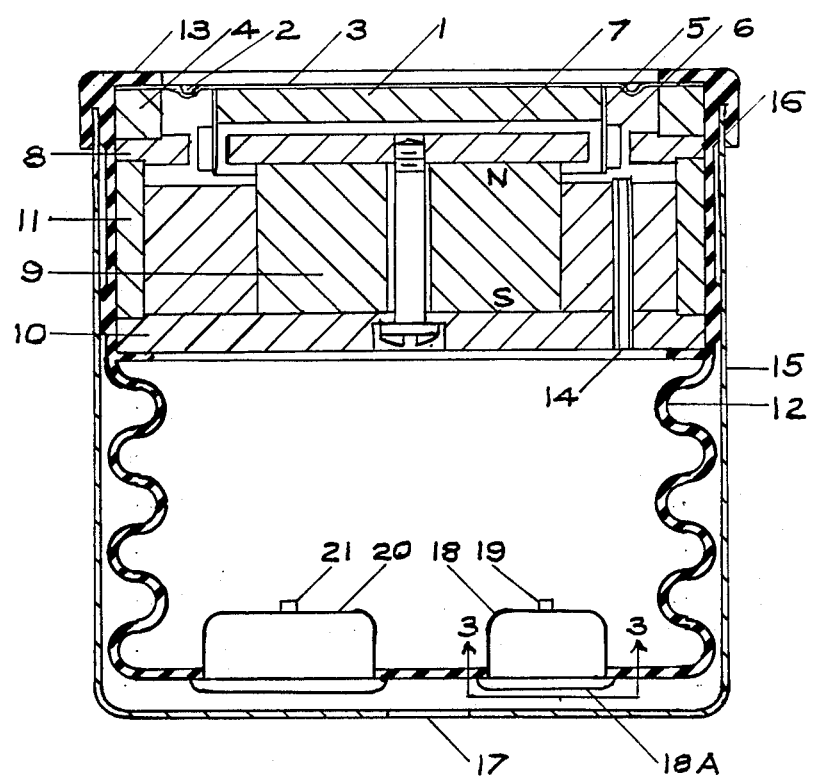
Fig 1

MEANS FOR EQUALIZING THE INTERNAL PRESSURE IN AN UNDERWATER TRANSDUCER EMPLOYING A VIBRATILE PISTON TO PERMIT OPERATION OF THE TRANSDUCER AT WATER DEPTHS IN EXCESS OF A FEW HUNDRED FEET

This invention is concerned with an improved means for equalizing the internal pressure with the external hydrostatic pressure in an underwater transducer employing a vibratile diaphragm as the sound generating source in order to permit satisfactory operation of the transducer in deep water in excess of approximately 100 ft. An illustrative example of a transducer that can benefit from this invention is shown in U.S. Pat. No. 4,763,307 issued to Frank Massa on August 9, 1988 and which is assigned to the same assignee of this invention. The illustrative transducer employs a vibratile piston diaphragm which is flexibly suspended at its periphery and is driven by electromagnetic forces generated in the magnetic circuit assembly which is part of the transducer construction. In order to equalize the internal pressure within the transducer housing with the hydrostatic pressure acting on the external surface of the vibratile diaphragm at the transducer operating depth, a flexible bellows-like air bag is sealed to the outside wall of the transducer housing and the air volume in the collapsible air bag communicates to the air space inside the transducer assembly through a hole in the transducer wall. The flexible wall of the air bag collapses as the transducer drops to the operating depth until the air pressure built up in the decreasing volume of the air chamber is equal to the hydrostatic pressure developed on the external vibratile diaphragm surface.

The above outlined description of a pressure equalization system taken from reference Patent 4,763,307 is satisfactory for use with transducers which are required to operate at water depths down to approximately 100 ft. However, for deeper water operation, the greatly reduced volume of the pressurized air that remains in the collapsed air chamber may very significantly increase the stiffness of the vibrating system which in turn can result in unacceptable large increases in the resonant frequency of the vibratile system sufficient to impair the normal operating characteristics of the transducer, especially at the lower audio frequencies.

In order to overcome the inherent deep water limitation of the conventionally used flexible-walled air bag as a pressure equalizer, this invention employs a high-pressure gas capsule mounted inside the air bag compartment. The capsule includes a valve and an activating mechanism which is responsive to the hydrostatic pressure in the water. The valve mechanism may be set to release the pressurized gas at a predetermined water depth, which is defined as the depth at which the air bag has collapsed to the minimum permissible volume beyond which the increased stiffness of the reduced air volume causes the performance of the transducer to become unacceptable. For example, a collapsible air bag having a convenient practical physical size will generally be able to collapse sufficiently to equalize the pressure inside the transducer down to approximately 100 ft. depth, where the hydrostatic pressure is in the vicinity of 4 atmospheres absolute. At this depth the air bag compartment will have collapsed to about ¼ of the maximum air volume which is contained in the air chamber when it is near the water surface at atmospheric pressure. For this 4 to 1 reduction in air volume accompanied by a 4 to 1 increase in pressure in the collapsed air chamber the air stiffness increase is 16 times the stiffness of the full air volume in the chamber at atmospheric pressure when the transducer is in shallow water. Since the air stiffness is generally made negligibly small compared to the mechanical stiffness of the suspension system for transducer designs used in shallow water operation, it is possible that in water depths beyond 50 ft., the air stiffness is not completely negligible and at 100 ft. depth the additional increase in air stiffness may become of concern when the transducer is operated at the lower end of the audio frequency region.

With the use of the inventive pressurized gas capsule, the capsule will automatically release its contents when the pressure release valve is set to open at a depth slightly less than the maximum permissible operating depth which, for example, may assumed to be about 100 ft. A sufficient amount of gas is contained in the pressurized capsule to expand the air bag to approximately its maximum uncollapsed volume and to provide the expanded full volume of the air chamber with an internal gas pressure of 4 atmospheres which is sufficient to equalize the 4 atmosphere external hydrostatic pressure at the 100 ft. depth. With this increased internal pressurization of the transducer with a fully expanded air chamber, the transducer will remain pressure equalized to an increased depth of approximately 300 ft. where the hydrostatic pressure is approximately 10 atmospheres. To further extend the pressure equalization to a depth greater than 300 ft., a second high-pressure capsule is mounted in the air bag compartment and it is automatically discharged at a slightly less hydrostatic pressure than the newly increased 300 ft. operational depth. As a result, the air bag is reinflated to its nearly full uncollapsed volume at a pressure of approximately 150 psi to equalize the internal pressure with the hydrostatic pressure at 300 ft., which will permit operation to an increased depth of approximately 600 to 800 ft. depending on the mechanical stiffness of the vibrating system in the transducer.

The primary object of this invention is to increase the operational depth of an underwater transducer that employs a vibratile diaphragm as the sound generating member which is flexibly suspended and sealed within an opening in a waterproof transducer housing structure. The transducer employs a flexible bellows-like air bag which communicates its contained air volume to the space behind the vibratile diaphragm inside the transducer sealed housing, whereby the exposed flexible wall surface of the air bag will collapse as the transducer is submerged in the sea and thereby will automatically increase the air pressure inside the sealed transducer housing to equalize the internal pressure acting on the non-radiating inside surface of the vibratile diaphragm with the external hydrostatic pressure to which the outer radiating surface of the vibratile diaphragm is exposed.

Another object of this invention is to extend the pressure equalization capability of a pressure equalized transducer that uses a collapsible air chamber to equalize the air pressure inside the sealed transducer housing structure with the hydrostatic pressure acting on the external surface of the transducer beyond the limited depth of operation imposed by the maximum amount of volume collapse capability of the air chamber.

An additional object of this invention is to further overcome the limitation in the volume collapse capability of a collapsible air chamber when used in combination with an underwater transducer to equalize the internal pressure in the transducer with the external hydrostatic pressure by incorporating a high pressure gas capsule inside the air chamber that is automatically discharged into the chamber at a predetermined depth where the chamber is collapsed to its maximum permissible operational limit and to restore the chamber to its approximately full uncollapsed volume when the high pressure gas is discharged in the collapsed chamber.

A still further object of this invention is to very greatly increase the volume collapse capability of a collapsible air chamber when used in combination with an underwater transducer to equalize the internal pressure in the transducer with the external hydrostatic pressure at greatly increased depths of operation by incorporating two high-pressure gas capsules inside the air chamber that are automatically discharged sequentially into the air chamber at two different predetermined depths as follows: at the first predetermined depth, the first relatively lower of the two high-pressure capsules will be discharged and will restore the collapsed air chamber to its full original volume with an internal pressure equal to the hydrostatic pressure level existing at said first predetermined depth; with the presurized full volume air chamber at said first predetermined depth, the operational depth of the transducer will be extended to said second predetermined depth which is approximately 3 times the first said predetermined depth, at which depth the second relatively higher of the two high-pressure capsules will be discharged and will restore the collapsed internal pressure equal to the hydrostatic pressure level existing at said increased second predetermined depth, in which instance the transducer operating depth will be further extended to a total of 6 to 8 times the said first predetermined operational depth, thus making the total increase in operational depth achieved by the inventive use of two pressurized gas capsules equal to approximately 6 to 8 times the depth equalizing capability of the collapsible air chamber without the use of the pressurized gas capsules.

These and other objects, features, and advantages of the invention will become more fully apparent from the following detailed description taken in conjunction with the accompanying drawings in which:

FIG. 1 is a plan view of an underwater transducer which illustrates the teachings of this invention.

FIG. 2 is a schematic cross-sectional view of the transducer taken along the line 2—2 of FIG. 1 and illustrates the use of a typical collapsible bellow-like air chamber to equalize the internal pressure on the non-radiating internal surface of the vibratile diaphragm and thereby neutralize the effect of the hydrostatic pressure acting on the external surface of the diaphragm at the operating depth of the transducer. Also illustrated schematically in FIG. 2 is the inventive use of pressurized gas capsules to greatly increase the pressure equalization capability of the air chamber to permit satisfactory operation of the transducer at greatly increased depths over the depth limitation inherent with the conventional use of a collapsible air chamber.

FIG. 3 is a view taken along the line 3—3 of FIG. 2.

Referring more particularly to the figures, the reference character 1 represents a vibratile piston 1 which is flexibly suspended at its periphery by a conventional circular corrugated bead 2 which is formed in a thin metallic disc 3 which is in turn fastened to a mounting ring 4 as shown. Over the outer periphery of the piston 1 is cemented a voice coil assembly comprising a collar member 5 which carries an attached copper winding 6. The mounted voice coil assembly is similar to the well known electrodynamic loudspeaker construction which has been in widespread use for radio and sound motion picture reproduction for more than half a century and is not part of this invention. The voice coil assembly is located in an air gap formed by a conventional magnetic structure comprising the concentric soft iron pieces 7 and 8 which provides the air gap in which the voice coil is suspended. The magnetic circuit is completed by the permanent magnet 9, a bottom soft iron plate 10 and the outer soft iron cylinder 11 as illustrated. The basic principal of operation of the electrodynamic speaker assembly as illustrated is very well known in the art and is not part of this invention.

When a transducer as described above is designed to be used for operation under water, the electromagnetic structure is made waterproof and a flexible bellows-like air bag 12, which may be molded in rubber, is provided with an overhanging flange portion 13 which provides a recessed cavity near its open end which can be cemented and sealed to the outside surface of the transducer magnetic assembly as illustrated in FIG. 2. The internal portion of the bellows-like air bag forms an air chamber which communicates through the hole 14 to equalize the pressure inside the magnetic structure with the external hydrostatic pressure acting on the outside surface of the vibratile diaphragm and also on the outer surface of the collapsible air chamber 12. A rigid outer protective housing 15 is cemented into a circular slot 16 molded into the open end portion of the rubber air chamber housing structure as shown in FIG. 2. An opening 17 in the closed end of the housing 15 provides an entrance for the water to enter and react on the outer surface of the rubber bellows 12 to collapse the bellows until the internal air pressure inside the bellows is equalized to the external hydrostatic pressure of the water at the operating depth of the transducer.

During the underwater operation of the transducer the air chamber will collapse more and more with increasing depth to automatically balance the internal air pressure on the vibratile diaphragm with the external increasing hydrostatic pressure acting on the external surface of the vibratile diaphragm which is in contact with the water. At a depth of approximately 100 ft. the hydrostatic water pressure due to the 100 ft. column of water is 3 atmospheres plus 1 atmosphere of pressure due to the air atmosphere acting on the top surface of the water. With a total of 4 atmospheres absolute pressure acting on the collapsible air chamber, the air chamber volume will decrease to 25% of its total original uncollapsed volume at zero depth in the water. As a result, the stiffness of the reduced air volume at 4 atmospheres pressure behind the vibratile diaphragm will be 16 times greater than the stiffness of the full air chamber volume at atmospheric pressure. This increased stiffness of the air chamber, when added to the stiffness of the diaphragm suspension system, could increase the resonance frequency of the vibrating system sufficiently to become unacceptable for any further increase in depth of operation by further reducing the air chamber volume. In order to permit greater depths of operation, the initial physical size of the air chamber volume could be increased; however, this would have the practical disadvantage of greatly increasing the total size of the transducer structure.

This invention will permit a further increase in the operational depth of the transducer without increasing the size of the air chamber volume by using a pressurized gas capsule 18 which is mounted inside the collapsible air chamber by cementing the flanged portion 18A of the capsule body to the flat end surface of the collapsible bellows 12 as illustrated in FIG. 2. The capsule includes a valve 19 that will automatically release the pressurized gas at a predetermined water depth, as determined by the hydrostatic pressure measured by the pressure sensitive release valve mechanism illustrated by the diaphragm 22 as shown in FIG. 3. The predetermined depth for the release of the pressurized gas from capsule 18 is when the collapsed air chamber volume has decreased to the minimum acceptable limit beyond which any further decrease in volume is considered unacceptable for the continued operation of the transducer. The volume and pressure of the gas contained in the capsule 18 is sufficient to expand the collapsed air chamber volume to its full original volume and with the gas pressure at the full volume made equal to the hydrostatic pressure that exists at the predetermined maximum permissible depth of operation. The increased pressurization and full restored volume of the air chamber achieved by the discharge of the pressurized gas in capsule 18 will permit satisfactory continued operation of the transducer at increased depths until a second predetermined depth is reached where the stiffness of the fully collapsed restored volume of the pressurized air chamber becomes unacceptable for operating the transducer at greater depths.

If it is desired to operate the transducer at still greater depths, a second pressurized gas capsule 20 with release valve 21 is also mounted inside the air chamber volume in the same manner as described for pressurized gas capsule 18 as illustrated in FIG. 2. The volume and gas pressure inside the capsule 20 is sufficient to again expand the collapsed pressurized volume of the air chamber to its original full volume at a gas pressure equal to the hydrostatic water pressure at said second predetermined water depth. The additional increased pressurization, together with the fully restored volume of the air chamber achieved by the discharge of the second pressurized gas capsule 20 will the permit continued operation of the transducer to still greater depths until a depth is reached beyond which the performance of the transducer becomes unacceptable. The pressurized capsules and the valve system for releasing the pressurized gas are shown schematically as representative of well known state-of-the-art systems and are not specifically part of this invention.

The above outlined description of a pressure equalization system taken from reference U.S. Pat. No. 4,763,307 is not satisfactory for use with transducers required to operate in deep water in the lower audio frequency region. For example, at a depth of approximately 100 ft., the hydrostatic pressure is approximately 4 atmospheres absolute. With 4 atmospheres acting on the collapsible air chamber, the total air chamber volume plus the air volume within the sealed magnetic structure will decrease to 25% of the original total air volume at zero depth in the water. As a result of the $\frac{1}{4}$ volume remaining at 100 ft. depth, combined with 4 times increase in the absolute pressure in the reduced chamber volume, the stiffness of the pressurized reduced volume of air be increased 16 times over the original stiffness of the total air volume at zero water depth. This increased stiffness of the air chamber, when added to the stiffness of the diaphragm suspension, can result in an increase in the resonance frequency of the vibrating system in the transducer sufficiently to become unacceptable for any further increase in depth of operation. This is especially true for a transducer that must operate in the lower audio frequency region and the resonance frequency of the vibrating system of the transducer at shallow depths is lower than approximately 300 Hz.

The inventive use of pressurized gas capsules with a differential pressure controlled valve system to maintain the gas pressure inside the air chamber equalized to the hydrostatic water pressure at the various water depths of operation has achieved the object of this invention; namely, to increase the operational depth of operation of an underwater transducer by extending the pressure equalization capability of a collapsible air chamber to equalize the air pressure inside the sealed transducer housing with the external hydrostatic pressure of the water at great depths in excess of approximately 100 ft.

To provide for improved low-frequency operation for the deep water transducer described above, I have found it desireable to use a preferred vibratile piston size within the approximate range 2 to 4 inches diameter. The water load on a vibratile piston whose diameter is less than $\frac{1}{3}$ wavelength at the operating frequency is approximately $5D^3$ grams, where D is the piston diameter in inches. To take advantage of the relatively high water loading that is added to the mass of the vibratile piston, I use an increased amount of copper wire in the voice coil construction as compared to conventional voice coil designs and thereby increase the efficiency of the transducer. By making the voice coil mass greater than $\frac{1}{3} D^3$ and less than $D^3$, the added mass of the voice coil is small compared to the water load mass. However, the increased amount of copper conductor used in the voice coil construction increases the electrodynamic force generated in the air gap for a fixed electrical power input to the driving coil and thus increases the acoustic power output of the transducer.

While a specific embodiment of the present invention has been shown and described, it should be understood that various modifications and alternative constructions may be made without departing from the true spirit and scope of the invention. Therefore, the appended claims are intended to cover all such equivalent alternative constructions that fall within their true spirit and scope.

I claim:

1. In combination in an underwater transducer for operating in deep water in excess of approximately 100 ft. in the lower audio frequency region of approximately 100 Hz to 4 kHz, a housing structure containing an opening, a vibratile piston whose diameter is less than $\frac{1}{3}$ wavelength at the frequency of operation, a flexible suspension system associated with said vibratile piston, characterized in that it serves as a flexible mounting for said vibratile piston and further characterized in that said flexibly mounted vibratile piston provides a seal for said opening in said housing structure, said flexibly mounted piston has a first surface which is external to said sealed housing structure and a second surface which is internal to said sealed housing structure, electromagnetic force generating means contained within said housing structure for generating vibratory forces, means for transmitting said vibratory forces to said vibratile piston whereby said vibratile piston will vibrate and the external surface of said mounted vibratile piston will transmit sound energy into a body of water when the transducer is immersed therein, pressure equalization means contained within said sealed housing structure for equalizing the pressure of the atmosphere inside said sealed housing structure to which the internal surface of said vibratile piston is exposed to approximate the hydrostatic pressure in the water to which the external surface of said vibratile piston is exposed when submerged, said pressure equalization means includes a collapsible waterproof wall portion as part of the external surface of said transducer housing structure, auxiliary pressurized gas supply means, means for automatically releasing said pressurized gas into said sealed housing when said collapsible wall portion of said sealed housing has collapsed to a predetermined magnitude whereby to inflate said collapsed wall portion while at the same time maintaining the pressure inside said inflated wall portion approximately equal to the external hydrostatic water pressure acting on the external surface of said vibratile piston whereby to increase the depth of operation of the transducer.

2. The invention in claim 1 characterized in that said electromagnetic force generating means includes a coil of insulated wire rigidly attached to the peripheral region of said vibratile piston, a magnetic circuit including a circular air gap, said circular air gap dimensioned to provide clearance for said coil of wire, said mounting structure for said vibratile piston dimensioned to position said coil in said air gap with sufficient clearance to insure unrestricted vibration of said vibratile piston during operation of the transducer.

3. The invention in claim 2 further characterized in that the diameter of the sound radiating portion of said flexibly suspended piston lies within the approximate range 2" to 4".

4. The invention in claim 3 further characterized in that the weight of the coil of wire in grams attached to said vibratile piston is greater than $\frac{1}{8} D^3$, where D is the diameter of the vibrating portion of the vibratile piston in inches.

5. The invention in claim 4 characterized in that the weight of the coil of wire attached to said vibratile piston is less than $D^3$.

6. The invention in claim 1 characterized in that said auxiliary pressurized gas supply means includes a pressurized gas capsule mounted inside said sealed housing structure, automatic valve means associated with said gas capsule for releasing said pressurized gas at a predetermined water depth, the volume of pressurized gas contained in said pressurized gas capsule is sufficient to restore the collapsed wall portion of said housing structure to its approximate uncollapsed state, thereby to increase the depth of operation of the transducer.

7. The invention in claim 2 characterized in that said auxiliary pressurized gas supply means includes a pressurized gas capsule mounted inside said sealed housing structure, automatic valve means associated with said gas capsule for releasing said pressurized gas at a predetermined water depth, the volume of pressurized gas contained in said pressurized gas capsule is sufficient to restore the collapsed wall portion of said housing structure to its approximate uncollapsed state, thereby to increase the depth of operation of the transducer.

8. The invention in claim 7 further characterized in that the diameter of the sound radiating portion of said flexibly suspended piston lies within the approximate range 2" to 4".

9. The invention in claim 8 further characterized in that the weight of the coil of wire in grams attached to said vibratile piston is greater than $\frac{1}{8} D^3$, where D is the diameter of the vibrating portion of the vibratile piston in inches.

10. The invention in claim 9 further characterized in that the weight of the coil of wire attached to said vibratile piston is less than $D^3$.

11. The invention in claim 1 characterized in that said auxiliary pressurized gas supply means includes at least two pressurized gas capsules mounted inside said sealed housing structure, automatic valve means associated with each capsule for releasing said pressurized gas from each of said pressurized gas capsules, the first of said plurality of automatic valve means operates at a first predetermined water depth to release said pressurized gas from said first pressurized capsule, said first pressurized capsule characterized in that the compressed gas volume contained in said first pressurized capsule is sufficient to restore the collapsed wall portion of said housing structure to its approximate uncollapsed state, thereby to increase the depth of operation of the transducer, the second of said plurality of automatic valve means operates at a second predetermined increased water depth to release said pressurized gas from said second pressurized capsule, said second pressurized capsule characterized in that the compressed gas volume contained in said second capsule is sufficient to again restore the collapsed wall portion of said housing structure at said second predetermined increased water depth to its approximate uncollapsed state, thereby to further increase the water depth of operation of the transducer.

12. The invention in claim 11 characterized in that said electromagnetic force generating means includes a coil of insulated wire rigidly attached to the peripheral region of said vibratile piston, a magnetic circuit including a circular air gap, said circular air gap dimensioned to provide clearance for said coil of wire, said mounting structure for said vibratile piston dimensioned to position said coil in said air gap with sufficient clearance to insure unrestricted vibration of said vibratile piston during operation of the transducer.

13. The invention in claim 12 further characterized in that the diameter of the sound radiating portion of said flexibly suspended piston lies within the approximate range 2" to 4".

14. The invention in claim 13 further characterized in that the weight of the coil of wire attached to said vibratile piston in grams is greater than $\frac{1}{8} D^3$, where D is the diameter of the vibrating portion of the vibratile piston in inches.

15. The invention in claim 14 further characterized in that the weight of the coil of wire attached to said vibratile piston is less than $D^3$.

16. In combination in an underwater transducer for operating in deep water in excess of 200 ft. in the lower audio frequency region of approximately 100 Hz to 4 kHz, a housing structure containing an opening, a vibratile piston, a flexible suspension system associated with said vibratile piston, said flexible suspension system characterized in that it serves as a flexible mounting for said vibratile piston and further characterized in that said mounted vibratile piston provides a seal for said opening in said housing structure, a first means contained within said housing structure for generating vibratory forces, a second means contained within said housing structure for transmitting said vibratory forces to said vibratile piston whereby said vibratile piston will vibrate and transmit sound energy into a body of water when the transducer is immersed therein, pressure equalization means for equalizing the pressure inside said sealed housing structure to the hydrostatic pressure at the water depth in which the transducer is immersed, said pressure equalization means includes a collapsible waterproof wall portion as part of the external surface of said sealed housing structure, communicating means between the air volume contained within said sealed housing structure and a source of pressurized gas, valve control means for releasing controlled amounts of pressurized gas into said sealed housing structure sufficient to maintain a gas pressure inside said housing structure approximately equal to the hydrostatic pressure of the water at the water depth to which the transducer is exposed.

17. The invention in claim 16 characterized in that said first means for generating vibratory forces for driving said vibratile piston includes a coil of insulated wire rigidly attached to the peripheral region of said vibratile piston, a magnetic circuit including a circular air gap, said circular air gap dimensioned to provide clearance for said coil of wire, said mounting structure for said vibratile piston dimensioned to position said coil in said air gap with sufficient clearance to insure unrestricted vibration of said vibratile piston during the operation of the transducer.

18. The invention in claim 17 further characterized in that the diameter of the sound radiating portion of said flexibly suspended piston lies within the approximate range 2" to 4".

19. The invention in claim 18 characterized in that the weight of the coil wire in grams attached to said vibratile piston is greater than $\frac{1}{8} D^3$, where D is the diameter of the vibrating portion of the vibratile piston in inches.

20. The invention in claim 19 further characterized in that the weight of the coil of wire attached to said vibratile piston is less than $D^3$.

* * * * *